United States Patent
Iida et al.

(10) Patent No.: US 9,386,176 B2
(45) Date of Patent: Jul. 5, 2016

(54) CUTTING APPARATUS

(71) Applicants: Mitsuhiro Iida, Hashima-gun (JP);
Tomoyasu Niizeki, Ichinomiya (JP);
Katsuhisa Hasegawa, Kasugai (JP);
Junnosuke Matsuda, Kanazawa (JP)

(72) Inventors: Mitsuhiro Iida, Hashima-gun (JP);
Tomoyasu Niizeki, Ichinomiya (JP);
Katsuhisa Hasegawa, Kasugai (JP);
Junnosuke Matsuda, Kanazawa (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 89 days.

(21) Appl. No.: 14/195,178

(22) Filed: Mar. 3, 2014

(65) Prior Publication Data

US 2014/0251103 A1 Sep. 11, 2014

(30) Foreign Application Priority Data

Mar. 5, 2013 (JP) ................................. 2013-042658

(51) Int. Cl.
*B41J 15/14* (2006.01)
*H04N 1/00* (2006.01)
*B26D 1/04* (2006.01)
*B41J 29/17* (2006.01)
*G03G 15/00* (2006.01)

(52) U.S. Cl.
CPC ............ *H04N 1/00679* (2013.01); *B26D 1/045* (2013.01); *B41J 29/17* (2013.01); *H04N 1/00546* (2013.01); *G03G 15/60* (2013.01); *G03G 2215/00814* (2013.01); *H04N 2201/02489* (2013.01); *H04N 2201/02495* (2013.01); *Y10T 83/162* (2015.04)

(58) Field of Classification Search
CPC ...... B41J 11/66; B41J 29/17; H04N 1/00679;
H04N 1/00546; B26D 1/045; Y10T 83/162;
G03G 2215/00814; G03G 15/60
USPC .................. 83/614, 613; 358/474; 399/4, 137
See application file for complete search history.

(56) References Cited

U.S. PATENT DOCUMENTS

| | | | |
|---|---|---|---|
| 5,803,622 A | 9/1998 | Mama et al. | |
| 5,991,054 A * | 11/1999 | Hung et al. | ..................... 358/474 |
| 2005/0186010 A1 | 8/2005 | Shibata et al. | |
| 2012/0253503 A1 | 10/2012 | Nakamura et al. | |
| 2013/0250374 A1 * | 9/2013 | Tashiro et al. | .................. 358/474 |

FOREIGN PATENT DOCUMENTS

| | | |
|---|---|---|
| EP | 1 557 246 A2 | 7/2005 |
| JP | H05-037731 A | 2/1993 |
| JP | H08-030062 A | 2/1996 |
| JP | 2005-212050 A | 8/2005 |

* cited by examiner

Primary Examiner — Omar Flores Sanchez
(74) Attorney, Agent, or Firm — Fox Rothschild LLP

(57) ABSTRACT

A cutting apparatus includes a housing formed with an insertion hole, a transfer unit configured to transfer an object inserted through the insertion hole, a reading unit configured to read an image of the object, a platen located opposite the reading unit, and a cutting unit. The reading unit includes a light-transmitting plate. The housing encloses the reading unit, the transfer unit, the platen and the cutting unit. The platen includes a part openable and closable so that a surface of the light-transmitting plate is externally exposed. The platen includes a first platen having a flat surface and a second platen which has a flat surface and is opposed to the surface of the light-transmitting plate and is openable and closable. The second platen is engaged with the first platen so that the flat surface of the second platen is flush with the flat surface of the first platen.

8 Claims, 11 Drawing Sheets

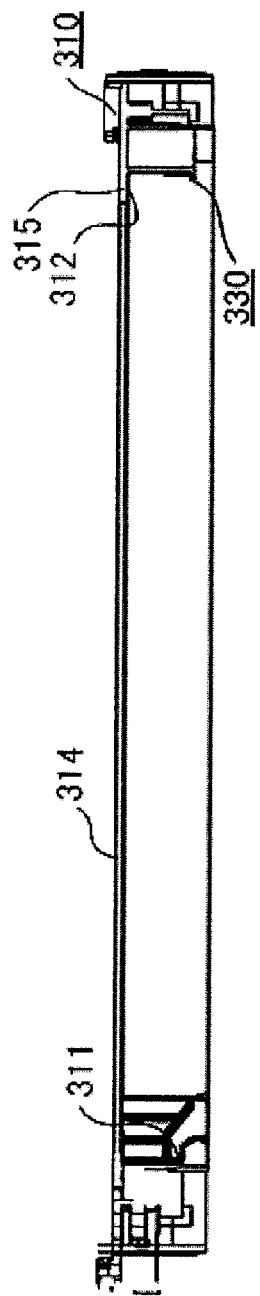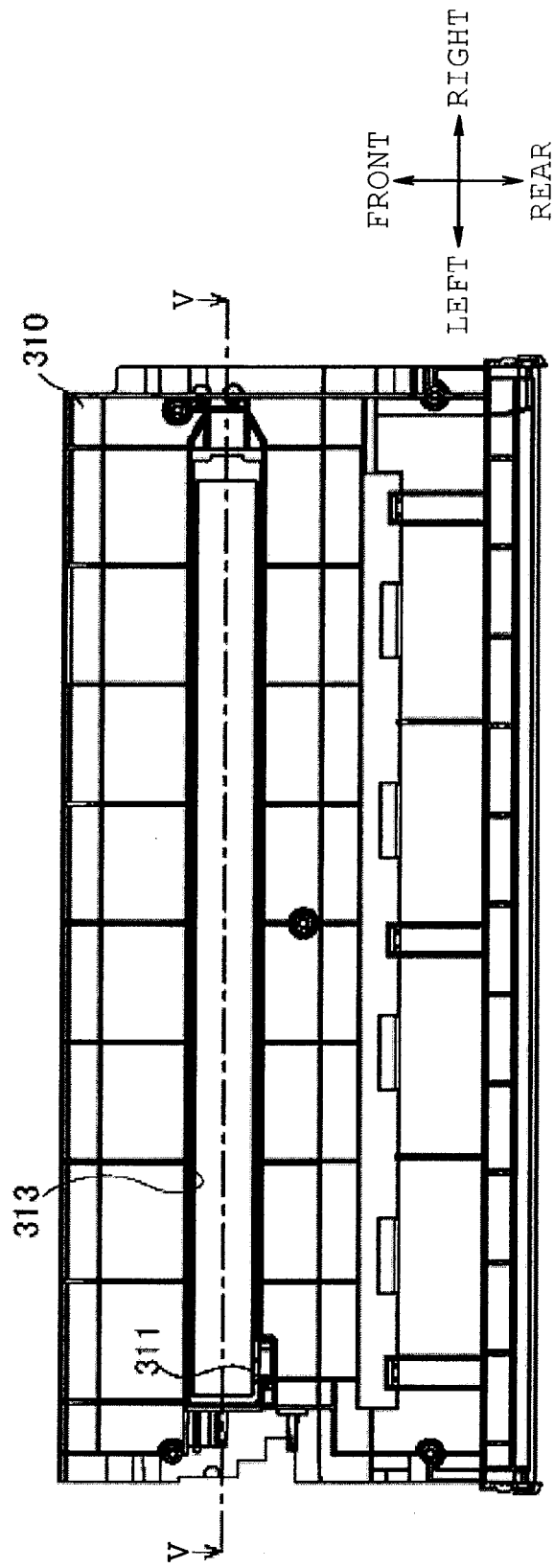

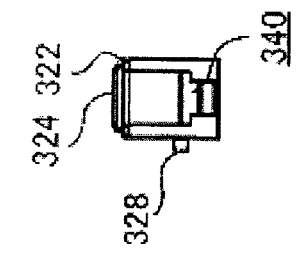
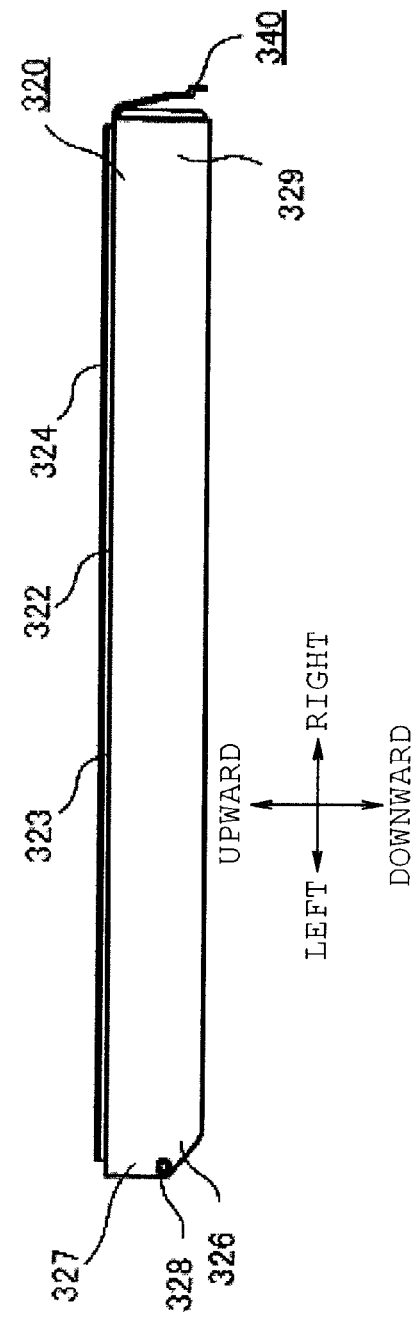
FIG. 6B
FIG. 6A

CUTTING APPARATUS

CROSS-REFERENCE TO RELATED APPLICATIONS

This application is based upon and claims the benefit or priority from the prior Japanese Patent Application No. 2013-042658 filed on Mar. 5, 2013, the entire contents of which are incorporated herein by reference.

BACKGROUND

1. Technical Field

The present disclosure relates to a cutting apparatus provided with an image reading function of reading an image on the surface of a sheet-shaped object such as paper while the object is being transferred.

2. Related Art

Image reading devices or image scanners have conventionally been known which read an image on the surface of a sheet-shaped object such as paper while the object is being transferred. Cutting apparatuses have also been known which cut a sheet-shaped object such as paper into a desired configuration.

Furthermore, optical readers have been disclosed which are configured to be capable of externally exposing an internal optical system. The internal optical system includes a mirror disposed inside a protecting glass plate and an optical reading section. When a user opens a cover mounted on the bottom of the optical reader, the internal optical system is externally exposed. As a result, the user can clean the internal optical system by removing paper dust from the internal optical system.

Furthermore, cutting apparatuses have been disclosed in which a medium such as paper is cut by a cutter blade. Now consider a case where the aforementioned optical reader is applied to the cutting apparatus. In this case, a large amount of dust such as paper dust is produced when the object is cut. Since dust adheres to a surface of the protecting glass plate located at the object side, the protecting glass plate needs to be cleaned. Now, assume that the protecting glass plate is enclosed in a housing and is disposed at a position inwardly away from an insertion hole for the object. In this case, the user needs to insert a cleaning member such as waste cloth through the insertion hole to the glass plate surface located at the object side. Accordingly, the user needs to detach various components or parts composing the apparatus to clean them. The user needs to reattach the cleaned components or parts after the cleaning, with the result of increase in troublesome task to be done by the user.

SUMMARY

Therefore, an object of the disclosure is to provide a cutting apparatus which is provided with a function of reading an image and in which the surface of the protecting glass plate located at the object side can easily be cleaned manually.

The present disclosure provides a cutting apparatus including a housing formed with an insertion hole through which a sheet-shaped object is inserted, a transfer unit configured to transfer the object inserted through the insertion hole, along a transfer path, a reading unit configured to read an image of the object transferred by the transfer unit, a platen located opposite the reading unit with the transfer path being interposed between the platen and the reading unit, the platen having a flat surface on which the object is placeable and a cutting unit disposed nearer the insertion hole than the reading unit on the transfer path, thereby cutting the object. In the apparatus, the reading unit includes a light-transmitting plate through which light passes. The housing encloses the reading unit, the transfer unit, the platen and the cutting unit. The platen includes at least a part which is openable and closable so that a surface of the light-transmitting plate located at the object side is externally exposed. The platen includes a first platen fixed to the housing and having a flat surface and a second platen which has a flat surface and is opposed to the surface of the light-transmitting plate located at the object side and is openable and closable. The second platen is engaged with the first platen so that the flat surface of the second platen is flush with the flat surface of the first platen.

BRIEF DESCRIPTION OF THE DRAWINGS

In the accompanying drawings:

FIGS. 5A and 5B are a back view and a longitudinally sectional rear view of a platen taken along line V-V in FIG. 5A, respectively;

FIGS. 6A and 6B are a front view and a right side elevation of the platen respectively;

DETAILED DESCRIPTION

One example of the cutting apparatus will be described with reference to the accompanying drawings.

Construction of a Cutting Apparatus 100

Figure 2:
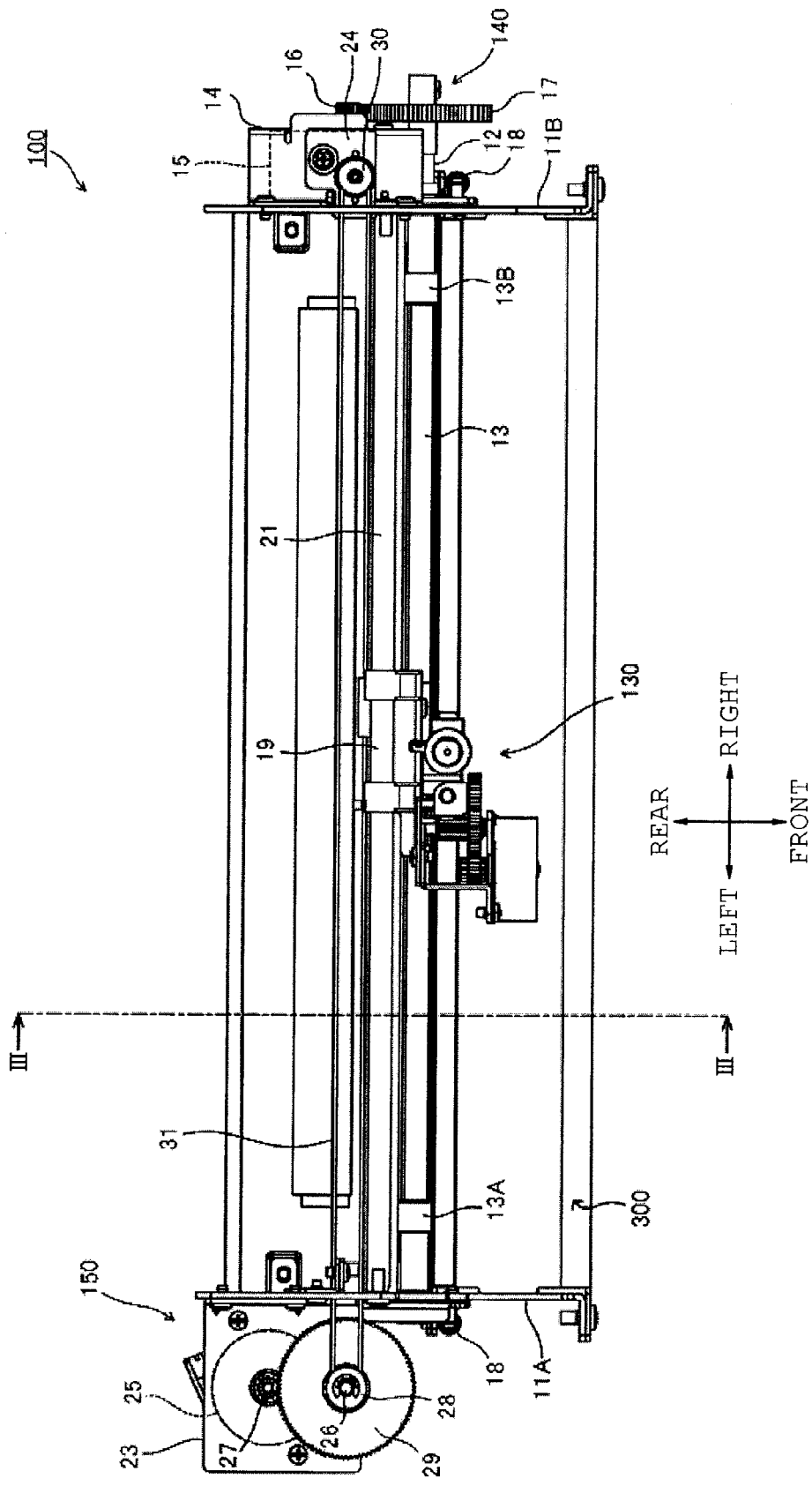
FIG. 2 is a front view of the cutting apparatus.
Figure 3:
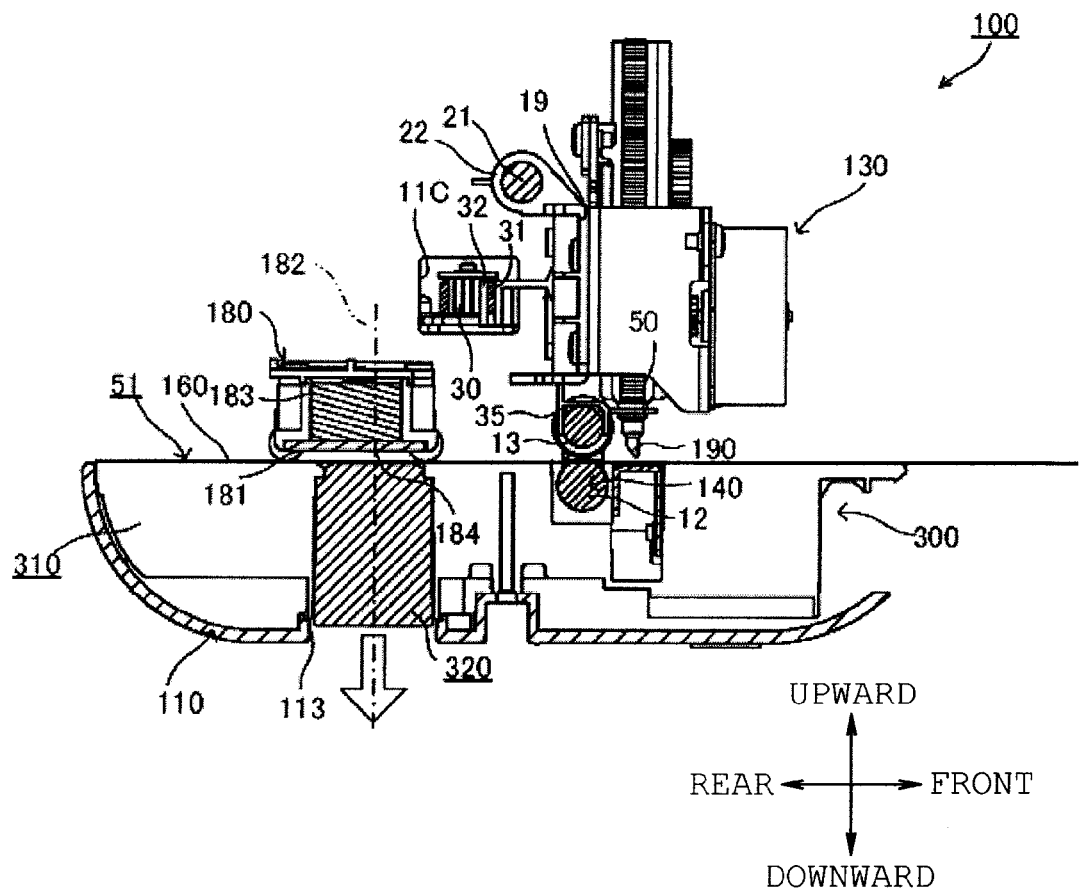
FIG. 3 is a longitudinally sectional left side view taken along line III-III in FIG. 2.

The construction of the cutting apparatus 100 will be described with reference to FIGS. 1 to 3. The cutting apparatus 100 is configured to cut a predetermined object 160 and includes a housing 110, a platen 300, a machine frame 11, a carriage 19, a cutting head 130, a transfer mechanism 140, a cutter moving mechanism 150, a display 170, switches 172 and a scanner 180.

Defining the directions, a transferring direction of the transfer mechanism 140 is referred to as "front-rear direction (Y-direction)." A moving direction of the cutter moving mechanism 150 is referred to as "right-left direction (X-direction)." A direction perpendicular to the front-rear direction and the right-left direction is referred to as "up-down direction (Z-direction)."

Figure 1:
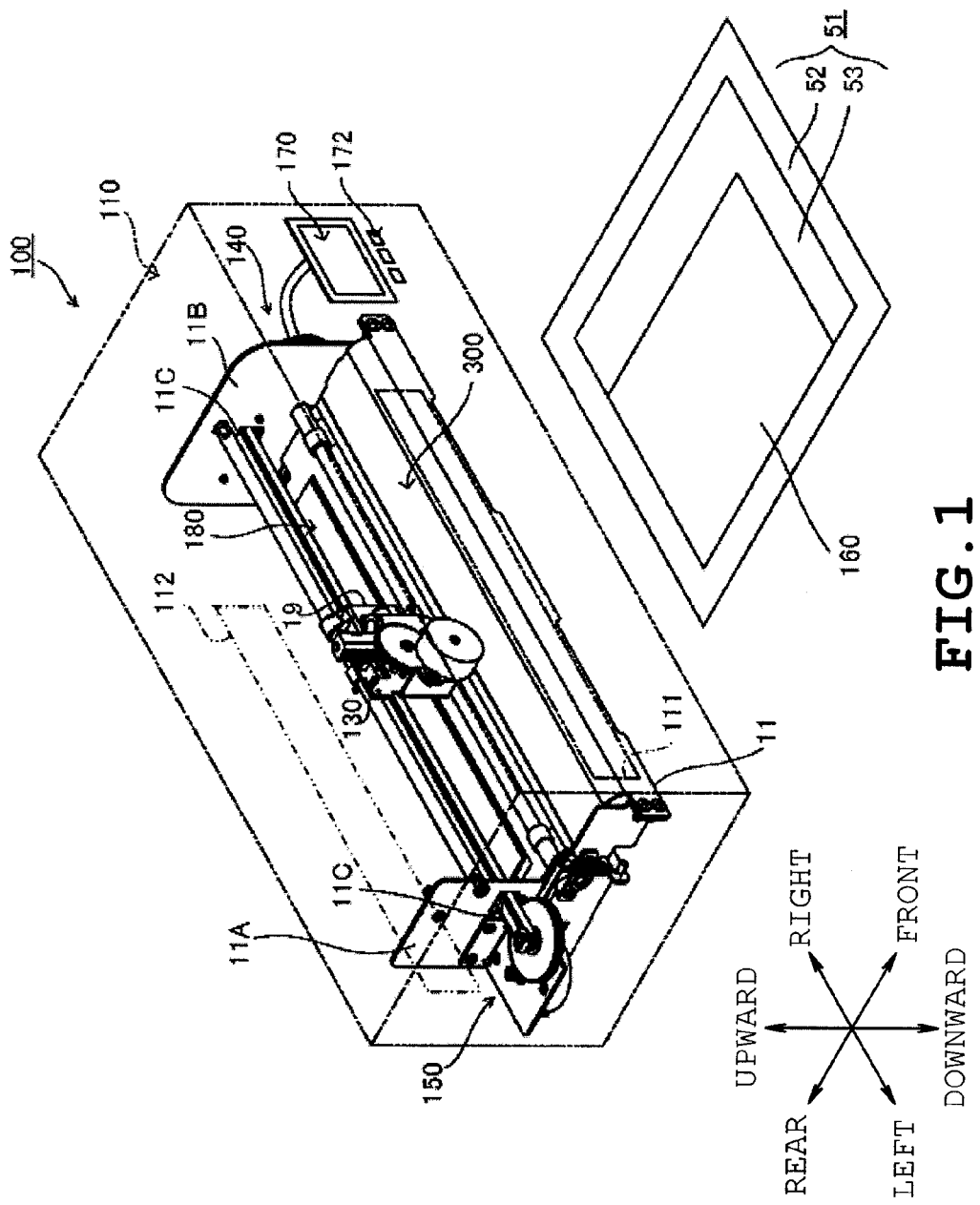
FIG. 1 is a perspective view of a cutting apparatus and a holding member in accordance with one example.

The housing 110 encloses the scanner 180, the transfer mechanism 140, the platen 300 and the cutting head 130 as shown in FIG. 1. The housing 110 is formed into the shape of a box elongated in the right-left direction. The housing 110 has a front formed with an insertion hole 111 and a rear formed with a rear hole 112. The insertion hole 111 extends in the right-left direction. A holding member 51 is to be inserted into the insertion hole 111.

The machine frame 11 is mounted on the housing 110. The machine frame 11 includes two sidewalls 11B and 11A located at right and left sides of the platen 300 respectively. The sidewalls 11A and 11B have respective surfaces facing each other. The sidewalls 11A and 11B have openings 11C through which a timing belt 31 passes, respectively. Each opening 11C is formed into a square shape. The timing belt 31 will be described later.

The holding member 51 holding the object 160 is inserted through the insertion hole ill and then transferred along a transfer path extending from the insertion hole 111 to the rear hole 112. The transfer path is provided along a flat surface of the platen 300 over the platen. The transfer mechanism 140 is configured to transfer the holding member 51 placed on the platen 300 in the front-rear direction. The holding member 51 will be described in detail later.

The display 170 and the switches 172 are mounted on a right-hand part of the front of the housing 110. The display 170 is a full-color liquid crystal display, for example. The switches 172 are operated by a user. The operation may include various instructions, selection and input. The switches 172 include a touch panel mounted on the surface of the display 170. The display 170 is configured to display a plurality of types of patterns, messages to be informed of the user, and the like. The user operates the switches 172 to select a pattern displayed on the display 170, to set various parameters, to instruct functions and the like.

The Holding Member 51

The holding member 51 will be described with reference to FIG. 1. The holding member 51 is configured to hold the object 160 which is paper, cloth or the like. The object 160 is formed into the shape of sheet. The holding member 51 is formed into the shape of a rectangular flat plate. The holding member 51 holding the object 160 is inserted through the insertion hole 111 of the housing 110 to be placed on the platen 300. The holding member 51 includes a base 52 and a holding portion 53. The base 52 is made of synthetic resin. However, the bass 52 may be formed of pasteboard or metal plate, instead. The holding portion 53 is disposed on the surface of the base 52. The holding portion 53 is configured to removably hold the predetermined object 160. The holding portion 53 is located in a generally rectangular inside region of the upper surface of the base 52. The holding portion 53 is an adhesive layer, for example. The object 160 is affixed to the adhesive layer thereby to be held by the holding member 51.

The Transfer Mechanism 140

The transfer mechanism 140 will be described in detail with reference to FIG. 2. The transfer mechanism 140 includes a driving roller 12, a pinch roller 13, a mounting frame 14, a Y-axis motor 15, a driving gear 16, a driven gear 17 and a pair of coil springs 18. The driving roller 12 and the pinch roller 13 are disposed between the right and left sidewalls 11B and 11A so as to extend in the right-left direction.

The sidewalls 11A and 11B support both ends of the driving roller 12 so that the driving roller 12 is rotatable. The driven gear 17 is secured to the right end of the driving roller 12. The mounting frame 14 is mounted on an outer surface of the right sidewall 11B. The Y-axis motor 15 is mounted on the mounting frame 14. The Y-axis motor 15 may comprise a stepping motor, for example. The driven gear 17 is brought into mesh engagement with the driving gear 16. The driving gear 16 has a smaller diameter than the driven gear 17. The driving gear 16 is fixed to an output shaft of the Y-axis motor 15. Upon rotation of the Y-axis motor 15, its rotational driving force is transmitted via the driving gear 16 and the driven gear 17 to the driving roller 12, whereby the driving roller 12 is rotated by the Y-axis motor 15.

The pinch roller 13 has right and left ends supported by the sidewalls 11B and 11A so as to be rot at able and so as to be slightly displaceable in the up-down direction, namely, in the thicknesswise direction of the object 160. The pinch roller 13 is normally biased downward at the outer surface sides of the sidewalls 11A and 11B by the coil springs 18. The coil springs 18 are disposed between both ends of the pinch roller 13 and the sidewalls 11A and 11B respectively. The pinch roller 13 includes two roller portions 13A and 13B disposed at both ends thereof respectively. The roller portions 13A and 13B have larger respective diameters than the pinch roller 13.

The holding member 51 has right and left edges which are held between the driving roller 12 and the roller portions 13A and 13B respectively. When the driving roller 12 is rotated by the drive of the Y-axis motor 15, the holding member 15 is transferred in the front-rear direction by the transfer mechanism 140 while the edges of the holding member 51 are held between the driving roller 12 and roller portions 13A respectively.

The Cutter Moving Mechanism 150

The cutter moving mechanism 150 will be described in detail with reference to FIG. 2. The cutter mechanism 150 is configured to move the cutting head 130 in the right-left direction intersecting the direction in which the holding member 51 is transferred. The cutter moving mechanism 150 includes a guide shaft 21, a mounting plate 23, an auxiliary mounting plate 24, an X-axis motor 25, a pulley shaft 26, a driving gear 27, a left timing pulley 28, a driven gear 29, a right timing pulley 30, an endless timing belt 31 and a mounting portion 32. The guide shaft 21 is disposed so as to extend in the right-left direction between the right and left sidewalls 11B and 11A and so as to be located above the pinch roller 13 in the rear of the pinch roller 11. The carriage 19 and the cutting head 130 are moved along the guide shaft 21 in the right-left direction.

The mounting plate 23 is mounted on a rear part of the outer surface of the left sidewall 11A. The auxiliary mounting plate 24 is mounted on the outer surface of the right sidewall 11B. The X-axis motor 25 is mounted on a rear part of the mounting plate 23. The pulley shaft 26 is rotatably mounted on a front part of the X-axis motor 25 and extends in the up-down direction. The driving gear 27 is fixed to an output shaft of the X-axis motor 25. The left timing pulley 28 and the driven gear 29 are rotatably supported by the pulley shaft 25. The left timing pulley 23 and the driven gear 29 are formed integrally with each other, thereby being rotated together. The driven gear 29 is brought into mesh engagement with the driving gear 27.

The right timing pulley 30 is rotatably mounted on the auxiliary mounting plate 24. The endless timing belt 31 extends between the right and left timing pulleys 30 and 28 horizontally in the right-left direction. The timing belt 31 includes a midway part coupled to the mounting portion 32 as shown in FIG. 3. The mounting portion 32 is disposed on the rear of the carriage 19 and caused to protrude rearward with respect to the carriage 19 to be coupled to the timing belt 31. Upon rotation of the X-axis motor 25, the rotational driving force thereof is transmitted via the driving gear 27, the driven gear 29 and the left timing pulley 28 to the timing belt 31. As a result, the carriage 19 is moved in the right-left direction by the X-axis motor 25.

The Scanner 180

The scanner 180 will be described in detail with reference to FIG. 3. The scanner 180 is configured to read an image of the surface of the object 160 transferred by the transfer mechanism 140. The scanner 160 includes a contact image sensor CIS 183 and a light-transmitting plate 181. Since the CIS 183 has a known configuration, a detailed description thereof will be eliminated. Briefly described, the CIS 183 includes an imaging device, a light source and a lens all of which are formed integrally with one another. The scanner 180 is located on the rear of the guide shaft 21 and has substantially the same width as the holding member 51.

The light source is configured to emit light toward the surface of the object 160 held by the holding member 51 placed on the platen 300. The light-transmitting plate 181 is disposed between the light source and the platen 300 to cause light emitted from the light source to pass therethrough. The light-transmitting plate 181 is a contact glass, for example. The image of the surface of the object 160 is read by the scanner 180 while the light-emitting plate 181 is in proximity to the upper surface of the object 160. More specifically, the image of the surface of the object 160 is read by the scanner 180 at a reading position 182. The imaging device is configured to image light passing through the light-transmitting plate 181 and reflected onto the object 160. The imaging device comprises a plurality of sensors arranged in the right-left or X direction. The cutting apparatus 100 is configured to generate cutting data to cut the object 160, based on the image of the object 160 surface read by the scanner 180.

The Platen 300

The platen 300 will now be described in detail with reference to FIG. 3. The platen 300 is located opposite the scanner 180 with the transfer path being interposed therebetween. The platen 300 has a flat surface on which the holding member 51 holding the object 160 is placeable. The platen 300 receives the underside of the holding member 51 when the cutting apparatus 100 cuts the object 160. The platen 300 is mounted on the machine frame 11 and has a horizontal upper surface. The driving roller 12 and the pinch roller 13 are disposed substantially on the center of the platen 300 with respect to the front-rear direction. The driving roller 12 is disposed under the pinch roller 13. The driving roller 12 has an upper end substantially flush with the upper surface of the platen 300. The holding member 51 is transferred while being placed on the platen 300 with the object 160 being held on the holding member 51.

The platen 300 has a lower part which is openable and closable so that the surface of the light-transmitting plate 181 located at the object 160 side is externally exposed. The platen 300 includes a first platen 310 and a second platen 320. The first platen 310 is fixed in position in the interior of the housing 110. The second platen 320 is located opposite the surface of the light-transmitting plate 181 located at the object 160 side and openable and closable. More specifically, the second platen 320 is opened and closed in the direction opposed to the surface of the light-transmitting plate 181. The housing 110 has a platen insertion hole 113 located below the second platen 320 thereof. The second platen 320 is opened and closed through the platen insertion hole 113. The light-transmitting plate 181 includes a surface located at the object 160 side. This surface further includes a surface 184 located near the cutting head 130. The second platen 320 is opposed to the surface 184 of the light-transmitting plate 181. The scanner 180 and the cutting head 130 are disposed above the transfer path. The second platen 320 is disposed below the transfer path.

The Carriage 19

Figure 4:
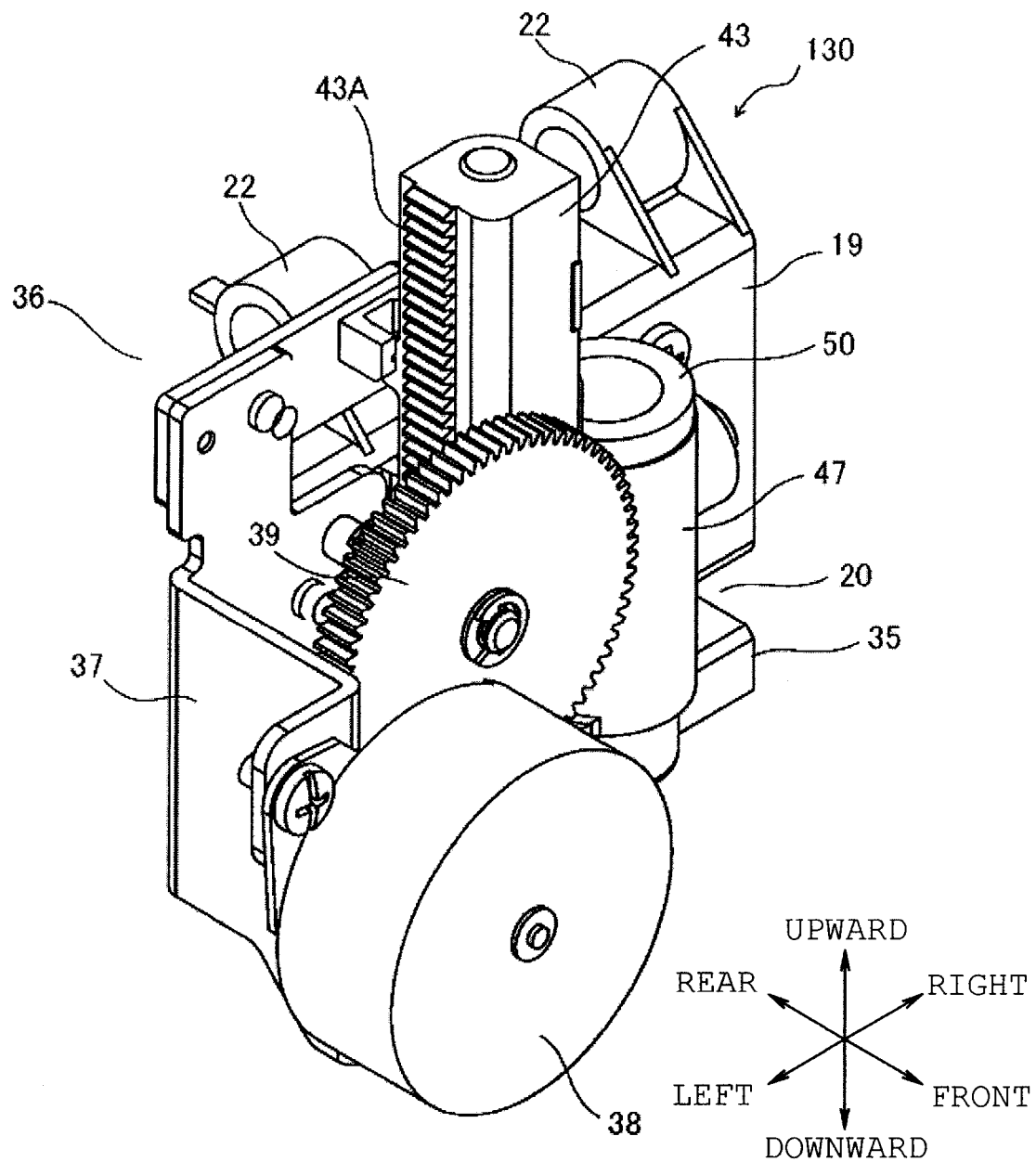
FIG. 4 is a perspective view of a cutting head and a carriage.

The carriage 10 and the cutting head 130 will be described in detail with reference to FIGS. 3 and 4. The carriage 19 includes a pair of guide cylinders 22 and a sliding contact portion 35. The guide cylinders 22 are disposed on right and left sides of the carriage 19 respectively. The guide shaft 21 is inserted through the guide cylinders 22. The sliding contact portion 35 is downwardly open as viewed from the left side and has a substantially U-shaped section. The sliding contact portion 35 is formed into the shape of a thin plate extending in the right-left direction. The sliding contact portion 35 has an inner surface slidably contacts with the pinch roller shaft 13. The pinch roller shaft 13 is supported so as to be displaceable in the thicknesswise direction of the object 160. Accordingly, the sliding contact portion 35 is brought into sliding contact with the pinch roller shaft 13 so as to be relatively movable along the direction in which the pinch roller shaft 13 is displaced. The sliding contact portion 35 is formed into such a shape as to interpose the pinch roller shaft 13 from the front-rear direction. The sliding contact portion 35 is movable in an area between the roller portions 13A and 13B of the pinch roller shaft 13. The sliding contact portion 35 is mounted on a lower end of the carriage 1 to retain the posture of the cutting head 130.

The Cutting Head 130

The cutting head 130 is disposed at the front side of the carriage 19 and includes a cutter holder 20 and an up-down drive mechanism 36. The cutter holder 20 is disposed on the right side of the cutting head 130. The up-down drive mechanism 36 is disposed on the left side of the cutting head 130. The cutting head 130 is disposed nearer to the insertion hole 111 on the transfer path than the scanner 130 is in order to cut the object 160. The cutter holder 20 includes a mounting cylinder 47 which is formed into a cylindrical shape and extends in the up-down direction. A cutting member 50 is detachable attached to the mounting cylinder 47 by a screw (not shown). The cutting member 50 includes a cutter 190 as shown in FIG. 3.

The up-down drive mechanism 36 includes a mounting plate 37, a Z-axis motor 38, an intermediate gear 39 and a rack member 43. The mounting plate 37 is provided at the left side of the front of the carriage 19 and formed into a crank shape. The Z-axis motor 38 is mounted on the left end front of the carriage 19 and may be a stepping motor 38, for example. The Z-axis motor 38 has an output shaft to which a driving gear (not shown) is fixed. This driving gear is brought into mesh engagement with the intermediate gear 39. The intermediate gear 39 is rotatably supported on the mounting plate 37. A smaller gear (not shown) having a smaller diameter than the intermediate gear 39 is axially formed on the intermediate gear 39. The intermediate gear 39 and the smaller gear are rotated together. The rack member 47 is provided on the left side of the mounting cylinder 47, extending in the up-down direction. The rack member 43 includes a rack portion 43A formed on a left wall of the rack member 43A, extending in the up-down direction. The rack portion 43A is brought into mesh engagement with the smaller gear.

Upon drive of the Z-axis motor 38, the driving gear is rotated, whereby the intermediate gear and the smaller gear are rotated with the result that the rack member 43 is moved in the up-down direction. As a result, the cutter holder 20 is moved upward and downward. More specifically, the cutter holder 20 is moved between a raised position where the blade edge of the cutter 190 is spaced from the object 160 by a predetermined distance and a lowered posit ion where the blade edge of the cutter 190 penetrates through the object 160.

When the cutter holder 20 is lowered by the up-down drive mechanism 36, the blade edge of the cutter 190 abuts against the object 160. While the blade edge is in abutment with the object 160, the holding member 51 is moved freely in the front-rear direction by the transfer mechanism 140, and the cutting head 130 is moved freely in the right-left direction by the cutter moving mechanism 150. As a result, the object 160 is cut by the cutter 190.

The First Platen 310

The first platen 310 will be described in detail with reference to FIGS. 5A and 5B. The first platen 310 has an opening 313 formed in the central part thereof in the front-rear direction so as to be long in the right-left direction. The second platen 320 is fitted into the opening 313. A shaft groove 311 is formed in the left rear side of the inner surface of the opening 313. The second platen 320 has a shaft 328 fitted into the shaft groove 311. The shaft groove 311 is substantially L-shaped and is directed rightwardly upward. Accordingly, the shaft 328 is prevented from being easily disengaged from the shaft groove 311 when fitted in the shaft groove 311. A frame 315 extends to the top and the inside of the opening.

The first platen 310 includes a first flat surface 312 and a second flat surface 314. The first flat surface 312 may be an underside of the frame 315 and the second flat surface 314 may be an upper surface of the frame 315. The first flat surface 312 has an engaged portion 330 provided in the right side surface of the opening 313. The second platen 320 has an engagement portion 340 which is engaged with the engaged portion 330 when closed, as will be described later. The second platen 320 also has a first flat surface 322 which abuts against the first flat-surface of the first platen 310 when closed, as will be described later.

The Second Platen 320

The second platen 320 will be described in detail with reference to FIGS. 6A and 6B. The second platen 320 is formed into the shape of a square pole extending in the right-left direction. The second platen 320 has an upper surface further having a first flat surface 322 and a second flat surface 324. The first flat surface 322 is formed so as to surround a periphery of the second flat surface 324 and is located lower than the second flat surface 324. When the second platen 320 is closed, the first flat surface 322 of the second platen 320 abuts against the first flat surface 312 of the first platen 310, as described above. At this time, the second flat surface 324 of the second platen 320 is flush with the second flat surface 314 of the first platen 310.

A reference part 323 is provided on the second flat surface 324 of the second platen 320 opposed to the surface of the light-transmitting plate 181. The reference part 323 is read by the scanner 180 in order that a shading compensation may be executed, for an image of the object 160 read by the scanner 180. The reference part 323 comprises a reference white, which is a color for compensating a white level of the image of the object 160 read by the scanner 180. In this case, the platen 300 is made of a resin material of the reference white. The reference part 323 may not be formed integrally with the platen 300. For example, the reference part 323 may be formed of an individual sheet comprising the reference white, and this sheet may be secured to the platen 300.

A slant 326 is provided at a left lower part of the second platen 320 and is formed by cutting off a left lower corner of the second platen 320. A shaft 328 protrudes forward from the left lower front of the second platen 320. The shaft 328 is provided on a first end 327 of the second platen 320 in a direction perpendicular to the direction in which the object 160 is transferred by the transfer mechanism 140. The first end 327 may be a left end of the front surface of the second platen 320, for example. The engagement portion 340 is provided on a second end 323 of the second platen 320 in a direction perpendicular to the direction in which the object 160 is transferred by the transfer mechanism 140. The second end 329 may be a right end of the right side surface of the second platen 329, for example.

Figure 7:
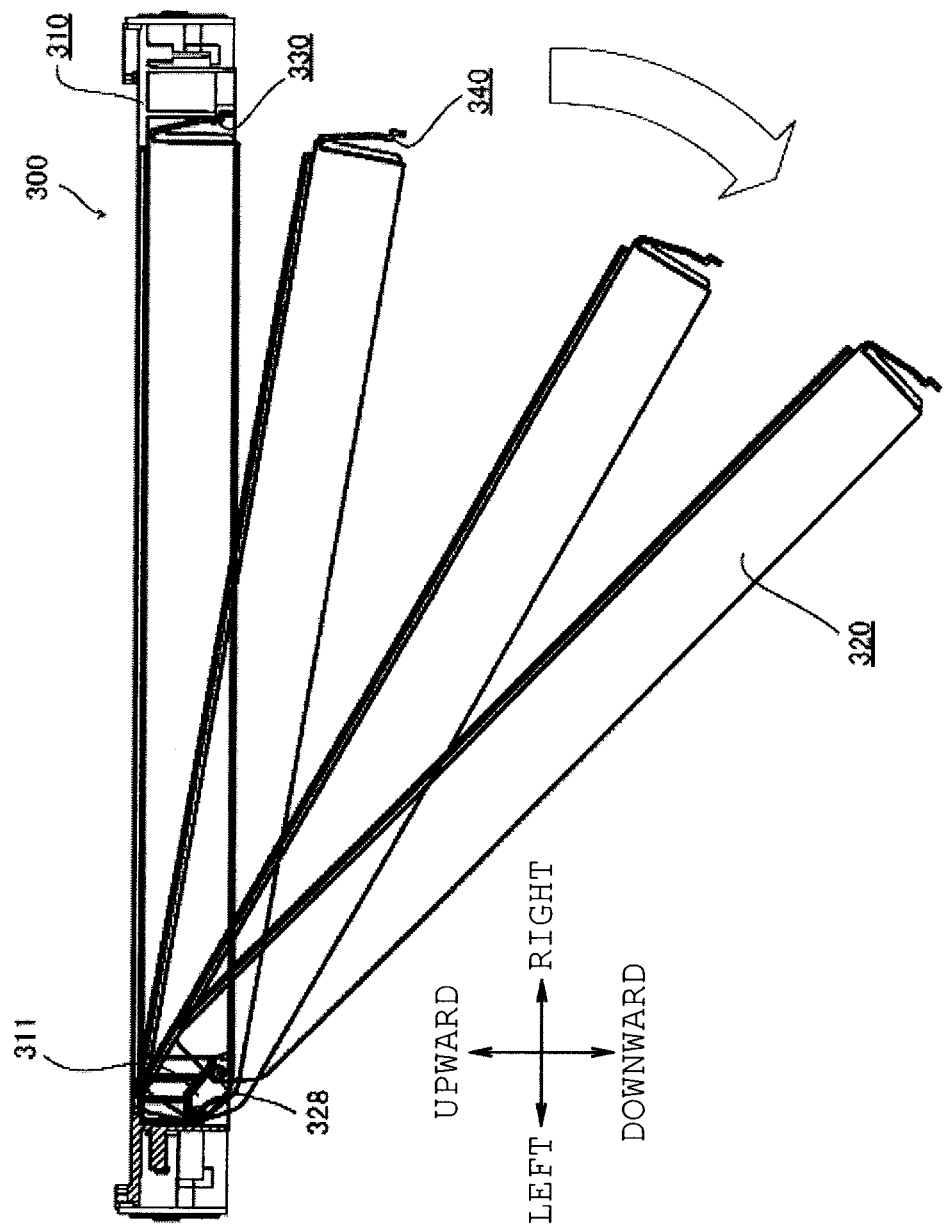
FIG. 7 is a rear view of the platen, showing an operation of the platen.

Opening and closing of the second platen 320 will be described with reference to FIG. 7. When the engagement portion 340 of the second platen 320 is disengaged from the engaged portion 330 of the first platen 310, the second platen 320 is pivotable about the shaft 328. In this case, the second platen 320 can pivot without abutting against the left wall of the opening 313 of the first platen 310 since the second platen 320 is formed with the slant 326. The platen 320 is moved to the lower left side of the first platen 310 while the shaft 328 is being moved along the shaft groove 311. When the shaft 328 is completely disengaged from the shaft groove 311, the second platen 320 can be detached from the first platen 310.

The Engagement Portion 340 and the Engaged Portion 330

Figure 8:
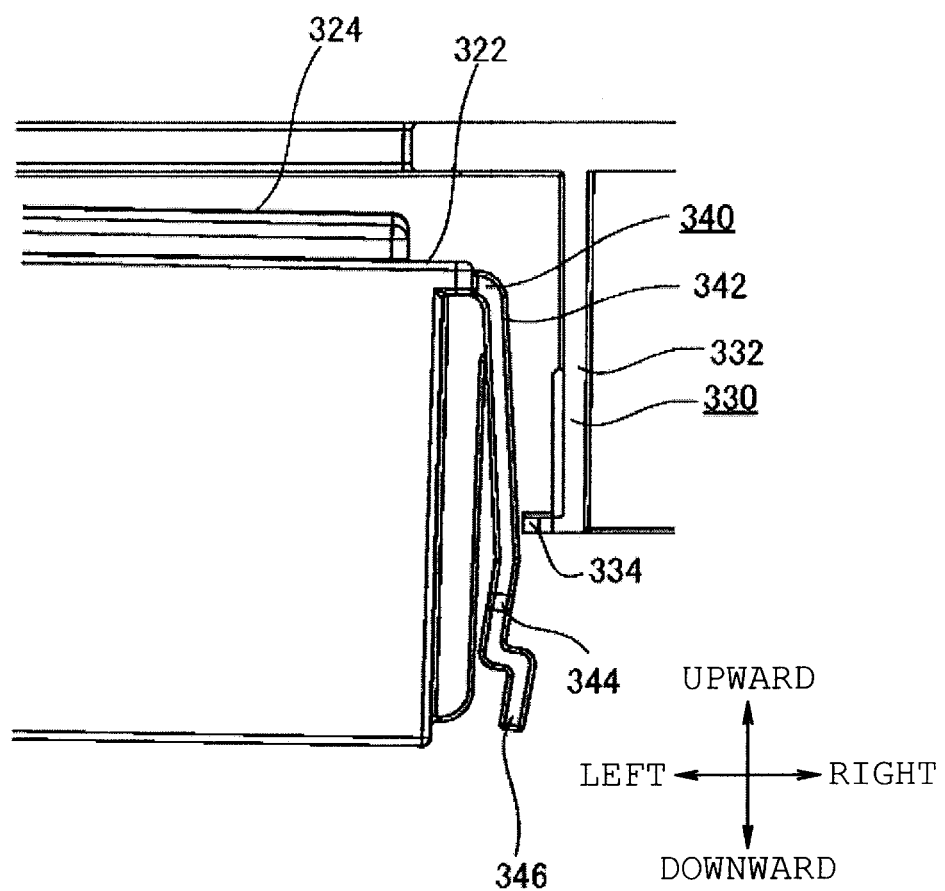
FIG. 8 illustrates an engaging portion disengaged from an engaged portion.
Figure 9:
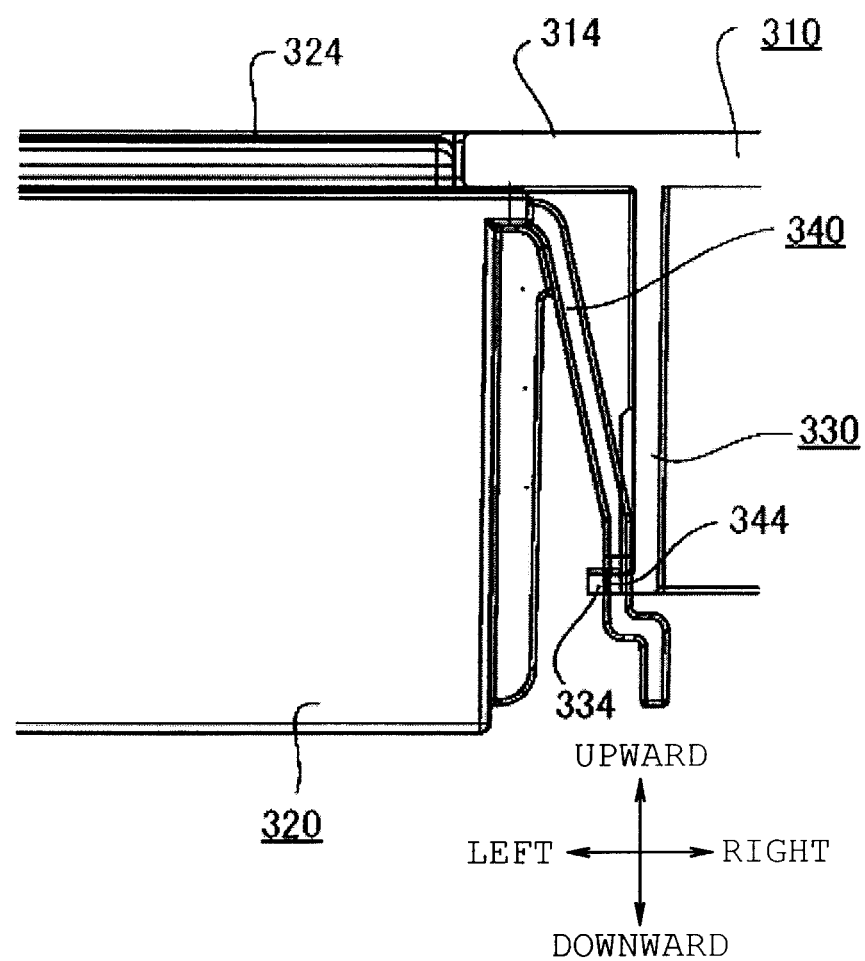
FIG. 9 illustrates the engaging portion engaged with the engaged portion.

The engagement portion 340 and the engaged portion 330 will be described in detail with reference to FIGS. 8 and 9. The engagement portion 340 is claw-shaped and has elasticity thereby to be deformable in the right-left direction. More specifically, when the second platen 320 is in engagement with the first platen 310, the engagement portion 340 imparts an elastic force in the right direction, whereby the second platen 320 is biased in the opposite or left direction. Thus, the elastic force of the engagement portion 340 prevents the second platen 320 from rattling in the lengthwise direction. The engagement portion 340 includes a claw 342 and a crank-shaped distal end 346. The claw 342 is formed with an engagement groove 344 formed through the claw 342 along a thicknesswise direction of the claw 342. A vertical height of the second platen 320 relative to the first platen 310 depends upon the engagement groove 344 and the shaft 328. The distal end 346 is provided for the user to hook the engagement portion 345 thereon with his/her fingers.

The engaged portion 330 includes a base 332 extending in the up-down direction and a protrusion 334 protruding leftward from a lower end of the base 332. The engagement portion 340 is engaged with the engaged portion 330 as shown in FIG. 3. Here specifically, the protrusion 334 is inserted into the engagement groove 344. When the engagement portion 340 of the second platen 320 is engaged with the engaged portion 330 of the first platen 310, the second flat surface 324 of the second platen 320 is flush with the second flat surface 314 of the first platen 310.

Advantageous Effects of the Embodiment

The second platen 320 is opened and closed in a direction opposed to the surface of the light-transmitting plate 181 in the embodiment. The user can easily clean the second platen 320 when opening the platen 320. Furthermore, the second flat surface 324 of the second platen 320 can also be cleaned easily.

The first platen 310 is fixed to the housing 110 and only the second platen 320 is opened in the embodiment. Consequently, only the object 160 side surface of the light-transmitting plate necessitating cleaning can easily be exposed externally.

In the embodiment, the second platen 320 is engaged with the first platen 310 so that the second flat surface 314 of the first platen 310 is flush with the second flat surface of the second platen 320. The second flat surface 314 of the first platen 310 is flush with the second flat surface 324 of the second platen 320. Accordingly, the holding member 51 is not caught between the second flat surface 314 of the first platen 310 and the second flat surface 324 of the second platen 320 when the holding member 51 is transferred by the transfer mechanism 140, with the result that the holding member 51 can be transferred smoothly.

In the embodiment, the light-transmitting plate 181 has the surface which is located at the object 160 side and includes the surface 184 located near the cutting head 130. The second platen 320 is opposed to this surface 184. Paper dust resulting from the cutting operation is easy to adhere to the surface 184. Accordingly, the surface 184 can easily be cleaned by opening the second platen 320.

In the embodiment, the scanner 180 and the cutting head 130 are disposed above the transfer path and the second platen 320 is disposed below the transfer path. More specifically, the second platen 320 is located near the bottom of the cutting apparatus 100. Accordingly, an external light is hard to enter the gap between the first and second platens 310 and 320, with the result that the object 160 can accurately be read by the scanner 180. Furthermore, the second platen 320 located at the side opposite the scanner 180 is detached so that the scanner ISO side is opened. Consequently, the size of the cutting apparatus 100 can be rendered smaller as compared with the case where the scanner 180 side is opened.

In the embodiment, the second platen 320 has the engagement portion 340 and the first platen 310 includes the engaged portion 330. Accordingly, the user can engage the second platen 320 with the first platen 310.

In the embodiment, the shaft 328 is located on the left end of the second platen 320 and the engagement portion 340 is located on the right end of the second platen 320. Furthermore, the shaft 328 protrudes toward the rear of the second platen 320 but not toward the front of the second platen 320. More specifically, since the second platen is longitudinally and bilaterally unsymmetrical, the user can insert the second platen 320 into the first platen 310 without error in the insertion direction.

The reference part 323 is provided on the second flat surface 324 of the second platen 320 in the embodiment. The cutting apparatus 100 can execute the shading compensation by reading the reference part 323 by the scanner 180. Furthermore, the user can clean the reference part 323 by opening the second platen 320.

The platen 300 is formed of the resin material of the reference white in the embodiment. Accordingly, no separate member of the reference white needs to be provided.

Modified Embodiments

The disclosure should not be limited to the foregoing embodiment but may be modified into the following form without departing from the gist thereof.

A Shutter 400

Figure 10:
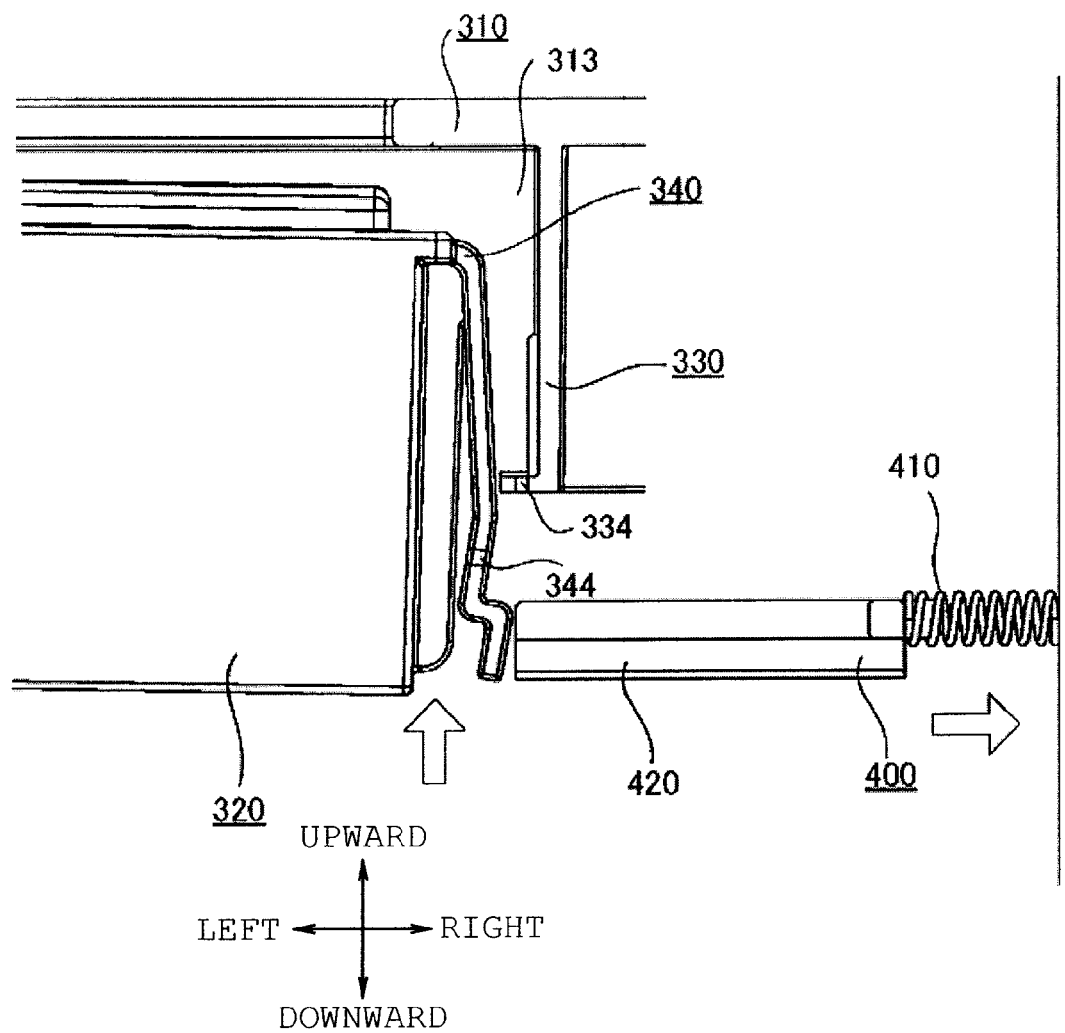
FIG. 10 illustrates the engaging portion disengaged from the engaged portion with a shutter being opened.

The second platen 320 is engaged with the first platen 310 by the engagement portion 340 and the engaged portion 330 in the embodiment. However, a shutter 400 may be added to the above-described construction as shown in FIGS. 10 and 11.

The shutter 400 includes a spring or more specifically, a compression coil spring 410 and a flat plate 420 which is supported on the first platen 310 so as to be movable in the right-left direction although flat plate 420 is not shown in detail. The flat plate 420 has a right end connected to a left end of the spring 410. The spring 410 has a right end connected to the first platen 310 although the connection is not shown in detail. When the spring 410 is in a free state, the flat plate 420 is located at such a position as to cover the distal end 346 of the engagement portion 340, as shown in FIG. 11.

The following will describe the case where the second platen 320 released from the first platen 310 is inserted into the opening 313 of the first platen 310. When the user inserts the second platen 320 into the opening 313, the engagement portion 340 abuts against the left end of the flat plate 420 as shown in FIG. 10. The spring 410 is then compressed.

Figure 11:
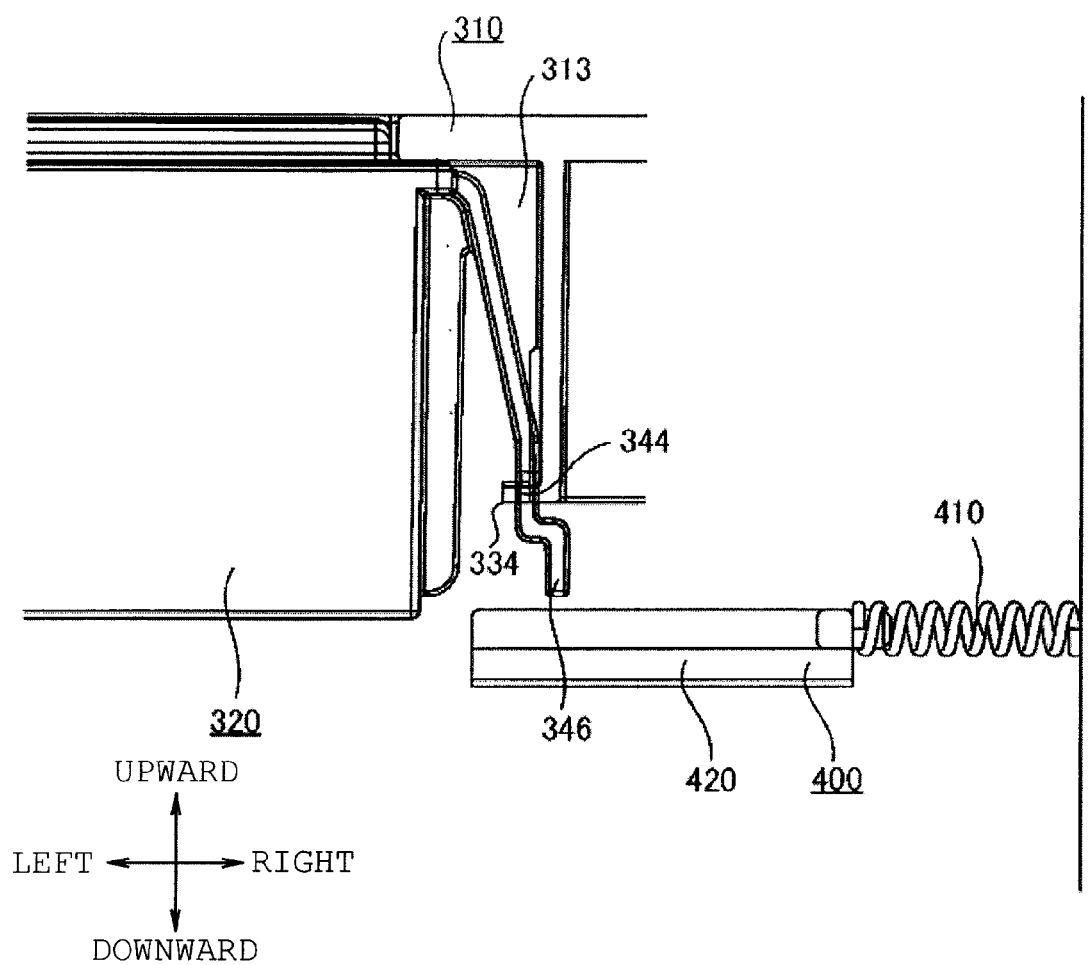
FIG. 11 illustrates the engaging portion engaged with the engaged portion with the shutter being closed.

The engagement portion 340 departs from the flat plate 420 when the user inserts the second platen 320 into a rear interior of the opening 313, as shown in FIG. 11. The protrusion 334 is then engaged with the engagement groove 344. At this time, the spring 410 returns to a free state and accordingly, the flat plate 420 returns to the position where the distal end 346 is covered with the flat plate 420. Thus, the distal end 346 is covered with the flat plate 420 when the protrusion 334 is engaged with the engagement groove 344. As a result, an external force can be prevented from acting on the distal end 346, that is, the engagement portion 340. In other words, the protrusion 334 can reliably be prevented from being disengaged from the engagement groove 344 by an external force acting on the engagement portion 340.

Furthermore, the flat plate 420 is moved rightward against the elastic force of the spring 410 when the second platen 320 is released from the first platen 310. In this state, the distal end 346 is moved leftward so that the protrusion 334 is disengaged from the engagement groove 344.

Additionally, the shutter 400 may be provided on the housing 110 although provided on the platen 300 in the foregoing embodiment.

The foregoing description and drawings are merely illustrative of the present disclosure and are not to be construed in a limiting sense. Various changes and modifications will become apparent to those of ordinary skill in the art. All such changes and modifications are seen to fall within the scope of the appended claims.

What is claimed is:

1. A cutting apparatus comprising:
   a housing formed with an insertion hole through which a sheet-shaped object is inserted;
   a transfer unit configured to transfer the object inserted through the insertion hole, along a transfer path;
   a reading unit configured to read an image of the object transferred by the transfer unit;
   a platen located opposite the reading unit with the transfer path being interposed between the platen and the reading unit, the platen having a flat surface on which the object is placeable; and
   a cutting unit disposed nearer the insertion hole than the reading unit on the transfer path, thereby cutting the object, wherein:
   the reading unit includes a light-transmitting plate through which light passes;
   the housing encloses the reading unit, the transfer unit, the platen and the cutting unit; and
   the platen includes at least a part which is openable and closable so that a surface of the light-transmitting plate located at the object side is externally exposed;
   the platen includes a first platen fixed to the housing and having a flat surface and a second platen which has a flat surface and is opposed to the surface of the light-transmitting plate located at the object side and is openable and closable; and
   the second platen is engaged with the first platen so that the flat surface of the second platen is flush with the flat surface of the first platen.

2. The apparatus according to claim 1, wherein the platen is opened and closed in a direction opposed to a surface of the light-transmitting plate.

3. The apparatus according to claim 1, wherein the light-transmitting plate has a surface which is located at the object side and near the cutting unit, and the second platen is opposed to said surface of the light-transmitting plate.

4. The apparatus according to claim 1, wherein the reading unit and the cutting unit are disposed above the transfer path and the second platen is disposed below the transfer path.

5. The apparatus according to claim 1, wherein the second platen has an engagement portion and the first platen has an engaged portion which is engaged with the engagement portion when the second platen is closed.

6. A cutting apparatus comprising:
a housing formed with an insertion hole through which a sheet-shaped object is inserted;
a transfer unit configured to transfer the object inserted through the insertion hole, along a transfer path;
a reading unit configured to read an image of the object transferred by the transfer unit;
a platen located opposite the reading unit with the transfer path being interposed between the platen and the reading unit, the platen having a flat surface on which the object is placeable;
a cutting unit disposed nearer the insertion hole than the reading unit on the transfer path, thereby cutting the object, wherein:
the reading unit includes a light-transmitting plate through which light passes;
the housing encloses the reading unit, the transfer unit, the platen and the cutting unit; and
the platen includes at least a part which is openable and closable so that a surface of the light-transmitting plate located at the object side is externally exposed,
wherein the platen is opened and closed in a direction opposed to a surface of the light-transmitting plate;
wherein the apparatus further comprises a reference part read by the reading unit in order that shading compensation may be carried out with respect to an image of the object read by the reading unit; and
wherein the reference part is provided on the surface of the platen opposed to the surface of the light-transmitting plate.

7. The apparatus according to claim 6, wherein the reference part comprises a reference white in order that a white level of an image of the object read by the reading unit may be compensated for.

8. The apparatus according to claim 7, wherein the platen is formed of a resin of the reference white.

* * * * *